July 12, 1960  E. T. ARMSTRONG ET AL  2,944,772
APPARATUS FOR MODULATING BRAKE PRESSURE
Filed Nov. 19, 1956
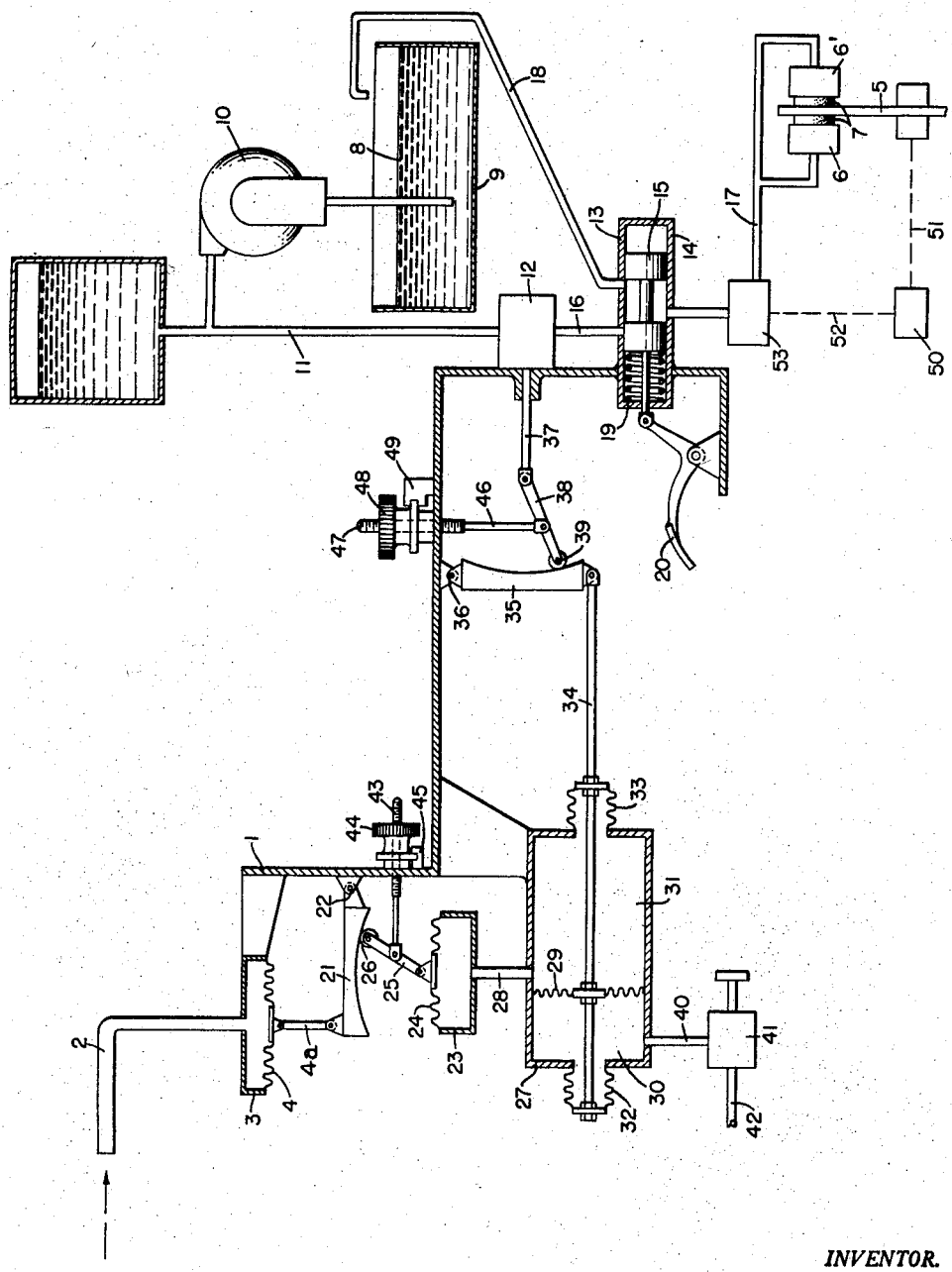
INVENTOR.
EDWARD T. ARMSTRONG
FRANK H. HIGHLEY
BY
*R. L. Miller*
ATTORNEY United States Patent Office 2,944,772
Patented July 12, 1960

2,944,772
APPARATUS FOR MODULATING BRAKE PRESSURE

Edward T. Armstrong, Butler, N.J., and Frank H. Highley, Canton, Ohio, assignors to The Goodyear Tire & Rubber Company, Akron, Ohio, a corporation of Ohio Filed Nov. 19, 1956, Ser. No. 622,904

3 Claims. (Cl. 244—111)

This invention relates to control of airplane brakes during a braking run and is especially useful where it is desired automatically to modulate the brake pressure to provide the highest braking efficiency at all times throughout such a braking run.

It is an object of the present invention to regulate pressure of the hydraulic liquid supplied to the pilot operated brake valve according to forward relative speed of the plane, especially as such speed is indicated by pressure differential developed at a pitot head.

Another object is to provide for modifying braking operation in accordance with the prevailing ground coefficient of friction, lift coefficient of the plane, and gross weight of the plane, and the provision of manually or automatically set controls therefor.

These and other objects will appear from the following description and the accompanying drawing.

Of the drawings, the single figure is a diagrammatic arrangement of apparatus constructed in accordance with and embodying the invention.

With reference to the drawing, the number 1 designates a fixed portion of an airplane on which is secured a pitot head 2 with its open end presented forward of the plane and thereby exposed to air under pressure. The pitot head 2 is connected to a hollow capsule 3 having a bellows diaphragm 4. The arrangement is such that as the speed of the airplane is increased, the diaphragm 4 is forced outwardly under pressure proportional to the ambient pressure and to the square of the relative aircraft speed, and an opposing action proportional to the ambient air pressure on the diaphragm permits instrument sensitivity at the diaphragm 4 which is responsive to relative speed alone.

The plane is provided with landing wheels (not shown), each having a brake disc 5 rotatable therewith, and flanked by brake cylinders 6, 6' each having a brake lining 7, arranged to be forced against the disc 5 by the cylinders under hydraulic pressure. The hydraulic operating fluid 8 on most large airplanes is drawn from a reservoir 9 by a pump 10 and delivered to a line 11 where it is kept under constant pressure. The fluid under pressure is supplied to brake cylinders 6, 6' by way of a pressure regulating valve 12 and the pedal-operated, pilot-controlled valve 13. The valve 12 may be any well known type of pressure regulating valve in which axial adjustment of a rod regulates the pressure in line 16 to the brake. A typical valve of this type is shown in U.S. Patent No. 2,574,426. The valve 13 is of the type normally used for airplane power brake systems. This is illustrated diagrammatically as comprising a cylinder 14 having a spool body 15 fitted therein which normally closes the supply line 16 from the delivery line 17 to the brake cylinders and opens the return line 18 to the line 17. Line 18 returns the fluid to the reservoir 9. The spool 15 may be moved along the cylinder 14 against a coil spring 19 by pedal 20 to connect the brake delivery line 17 with the supply line 16, shutting off the return line 18.

The purpose of valve 12 is to regulate the pressure supplied to the brake cylinders according to various factors hereinafter discussed one of which is the speed of the plane during its landing or braking run, it being desirable to always employ the greatest braking pressure consistent with wheel load which is a function of relative plane speed. To control the valve 12 from the air velocity at the pitot tube 2, the center of diaphragm 4 is connected by a link 4a to the free end of a cam arm 21 pivoted at 22 to the frame 1. Any movement of diaphragm 4 in a vertical direction as seen in Fig. 1 will, through link 4a, cause a corresponding movement of cam arm 21 about its pivot 22. A capsule 23 is provided with a bellows diaphragm 24 parallel to and spaced from diaphragm 4. A link 25 is pivotally secured to the center of diaphragm 24 and has a roller 26 at its opposite end which bears against cam arm 21 in position to transmit any downward movement of diaphragm 4 to diaphragm 24 in proportion to the relative positions of the links 4a and 25 in their engagement with cam arm 21. Capsule 23 is connected to a cylinder 27 by a pipe 28. Cylinder 27 has a bellows diaphragm partition 29 dividing it into chambers 30 and 31. Its end walls are centrally apertured to connect with bellows capsules 32 and 33 respectively. A rod 34 extends axially of cylinder 27 and is secured to the center of diaphragm 29 and to capsules 32 and 33. The rod 34 also is pivotally connected to the free end of a cam arm 35 pivotally mounted at 36 to frame 1.

The valve 12 has a plunger 37 whose movement controls the pressure passed by the valve, and to the end of the plunger is pivotally secured a link 38 which carried a roller 39 engaging the cam surface of cam arm 35. The arrangement is such that any movement of diaphragm 29 to the right in Fig. 1 will cause cam arm 35 to swing to the right to increase pressure of hydraulic fluid at the brakes, and movement of diaphragm 29 to the left will decrease pressure by permitting plunger 37 to move to the left.

The pipe 28 connects with the chamber 31. Chamber 30 is connected by a pipe 40 through an air pressure regulating valve 41 with a conduit 42 connected to an air pressure source.

It is apparent that when the fluid pressures in chambers 30 and 31 are equal, the rod 34 does not move. Also pressure in chamber 31 and capsule 23 will always be substantially equal. Pressure in capsule 23 is controlled by the pressure in capsule 3, depending upon the position of link 25. As the pressure in chamber 30 is constant for any adjustment of valve 41, variations of pressure in capsule 3 cause proportional variations of pressure in capsule 23 and chamber 31 depending upon the position of roller 26 in contact with cam arm 21 which causes movement of rod 34 (until balanced against pressure in chamber 30) and corresponding movement of valve plunger 37 to adjust fluid pressure in lines 16 and 17 to the brakes, thereby adjusting brake application according to speed of the airplane.

In the application of brakes on an airplane, it is understood that when an airplane first touches down on a landing run that most of the weight of the airplane is borne by the wings and the brakes cannot be applied very strongly without skidding the wheels. As the airplane slows down, the weight of the plane progressively transfers to the wheels and the brakes can be applied more strongly. More in detail, it can be shown mathematically that for ideal application of brakes of an airplane during a landing or braking run, the pressure applied to the brakes at any instant should be:

$$P = \frac{U_r}{U_d} \frac{R_r}{R_t} \frac{1}{A} \left[ W - C_1 \frac{D}{2} S V^2 \right]$$

Where:
P=modulated pressure
$U_r$=runway coefficient of friction
$U_d$=disc coefficient of friction
$R_r$=rolling radius
$R_f$=friction radius
A=lining area
W=aircraft weight
$C_1$=lift coefficient in the landing run
D=density of air
S=effective aircraft surface
V=airspeed In practice, many of the terms of the above equation are not constant but they vary within specific limits.

To provide for adjusting the apparatus to account for such variations in these terms, the following ratio changing means or adjustments are provided.

The link 25 is pivotally connected at its center to a threaded rod 43 which extends through frame 1 and is engaged by a threaded adjusting nut 44. A keeper 45 retains the nut against movement away from the frame 1 so that at any position of adjustment of the nut, the pivotal position of the link 25 is fixed horizontally as seen in Fig. 1 but may move vertically due to looseness of the joints and flexibility of the rod 43 sufficient to transmit motion vertically throughout a distance representing diaphragm movement. As the nut 44 is turned in one direction, it moves rod 43 axially to move roller 26 further from pivot 22 and thereby increase the pressure ratio between capsules 3 and 23, and when turned in the opposite direction, decreases the ratio. The nut 44 is graduated to represent lift coefficient and may be set by the pilot to the lift coefficient of the plane during the time the brakes are to be applied (landing or take-off).

The air pressure regulating valve 41 is graduated to the gross weight of the plane under the conditions of each brake stop and may be set by the pilot to the proper setting.

For adjusting the apparatus to the ground coefficient of friction, the center of link 38 is pivotally connected by a link 46 to a threaded rod 47 which extends through a clearance opening of the frame 1 and is engaged by a threaded adjusting nut 48. The nut is retained on the frame by a keeper 49. Turning nut 48 to raise rod 47 and the link 46 decreases the movement of the valve rod 37, and lowering it increases the movement upon movement of rod 34. The nut 48 is graduated to indicate ground coefficient and is adjusted by the pilot.

With the lift coefficient adjustment, the gross weight adjustment, and the ground coefficient adjustment properly set to the values corresponding to the plane and ground conditions, the only variable remaining is the plane's relative velocity which as determined by the pitot head, automatically adjusts the brake fluid pressure whereby the wheels are braked to substantially maximum efficiency at all times during a landing or braking run.

With the apparatus of the invention illustrated in Fig. 1, the brake pedal valve 13 is supplied through the pressure modulating valve 12 from the constant pressure supply and controls application of fluid under pressure to the brakes.

The apparatus of the invention as heretofore described may be used in connection with anti-skid apparatus such, for example, as that shown in U.S. Patent No. 2,753,017 issued July 3, 1956, on an application of M. I. Curl et al. and entitled Anti-Skid Mechanism for Master Cylinder Operated Brake. More specifically, if so used, a wheel speed or deceleration sensitive unit 50 is connected by means 51 with the wheel or brake disc and is in turn connected by means 52 to a valve 53 in line 17 so that when the wheel begins to skid valve 53 is shut releasing braking pressure on the wheel.

From the foregoing, it will be seen that the objects of the invention have been accomplished. The brakes of the airplane are always under the control of the pilot, and he can get any degree of automatic control desired up to full automatic control with brake pedal 20 fully depressed, and this is the normal manner of use. But, in no event can a greater pressure be obtained than that determined by the control mechanism. However, it is possible for the pilot to vary the position of the brake pedal to additionally control the operation of the brakes. For example, there are times in the operation of the brakes when maximum braking effort is not required and it is during these times that the pilot will position pedal 20 to obtain the brake action desired.

While a certain representative embodiment and details have been shown for the purpose of illustrating the invention, it will be apparent to those skilled in the art, that various changes and modifications may be made therein without departing from the spirit or scope of the invention.

What is claimed is:

1. Apparatus for modulating the pressure which can be applied to hydraulic brakes in an airplane, said apparatus including a supply of fluid under pressure, a hydraulic brake, a pilot-controlled valve for passing fluid from said supply to the brake, a fluid pressure regulating valve positioned between the brake and the said supply of fluid pressure for modulating the pressure of fluid passed by the pilot-controlled valve to the brake, means responsive to the airspeed of the airplane, means including mechanical linkage connecting the airspeed responsive means to the pressure regulating valve to position the valve as a function of airspeed, and hand adjusting means to change the mechanical throw of said mechanical linkage to effect proportional changes in the control effect of the airspeed responsive means, said hand adjusting means including means for changing the throw in proportion to the weight of the airplane and means for changing the throw in proportion to the ground coefficient of friction of the runway on which the airplane is to land.

2. Apparatus for modulating the pressure which can be applied to hydraulic brakes in an airplane, said apparatus including a supply of fluid under pressure, a hydraulic brake, a pilot-controlled valve for passing fluid from said supply to the brake, a fluid pressure regulating valve positioned between the brake and the said supply of fluid pressure for modulating the pressure of fluid passed by the pilot-controlled valve to the brake, means responsive to the airspeed of the airplane, means including mechanical linkage connecting the airspeed responsive means to the pressure regulating valve to position the valve as a function of airspeed, and hand adjusting means to change the mechanical throw of said mechanical linkage to effect proportional changes in the control effect of the airspeed responsive means.

3. Apparatus for modulating the pressure which can be applied to hydraulic brakes in an airplane, said apparatus including a supply of fluid under pressure, a hydraulic brake, a pilot-controlled valve for passing fluid from said supply to the brake, a fluid pressure regulating valve positioned between the brake and the said supply of fluid pressure for modulating the pressure of fluid passed by the pilot-controlled valve to the brake, means responsive to the airspeed of the airplane, means connecting the airspeed responsive means to the pressure regulating valve to position the valve as a function of airspeed, and hand adjusted means for effecting proportional changes in the control effect of said last-named means as required by varying conditions of airplane weight and the lift coefficient of the wings.

References Cited in the file of this patent

UNITED STATES PATENTS

| | | |
|---|---|---|
| 2,574,426 | Trevaskis | Nov. 6, 1951 |
| 2,671,620 | Andrews | Mar. 9, 1954 |
| 2,764,372 | Baird et al. | Sept. 25, 1956 |
| 2,788,186 | Wilson | Apr. 9, 1957 |